(12) United States Patent
Camacho et al.

(10) Patent No.: US 9,955,240 B1
(45) Date of Patent: Apr. 24, 2018

(54) SYSTEM AND METHOD TO DYNAMICALLY DETERMINE STATUS OF VEHICLE TO BE USED BY MOBILE APPLICATION

(71) Applicant: General Motors LLC, Detroit, MI (US)

(72) Inventors: Esteban Camacho, Belleville, MI (US); Alexander X. Cermak, Grosse Pointe Woods, MI (US); Ryan Olejniczak, Clinton Township, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 15/332,640

(22) Filed: Oct. 24, 2016

(51) Int. Cl.
*G08C 19/22* (2006.01)
*H04Q 9/00* (2006.01)

(52) U.S. Cl.
CPC ........... *H04Q 9/00* (2013.01); *H04Q 2209/40* (2013.01)

(58) Field of Classification Search
CPC ................................. G07C 5/008; H04L 67/10
USPC .................................................... 340/870.07
See application file for complete search history.

(56) References Cited

U.S. PATENT DOCUMENTS

| 2007/0093943 | A1* | 4/2007 | Nelson | B60R 25/2018 701/2 |
| 2012/0179336 | A1* | 7/2012 | Oakley | E05F 15/79 701/49 |
| 2016/0113043 | A1* | 4/2016 | O'Brien | H04W 76/02 370/338 |

* cited by examiner

*Primary Examiner* — Fabricio R Murillo Garcia
(74) *Attorney, Agent, or Firm* — David Willoughby; Reising Ethington P.C.

(57) ABSTRACT

A system and method are provided for facilitating remote communications with a vehicle using a wireless device. The method includes automatically receiving data from at least one vehicle control module, receiving a request from the wireless device to perform a task relating to the vehicle, determining a status of a vehicle function based on the data received from the at least one vehicle control module, determining whether the task is redundant based on the status of the vehicle function, and when the requested task is redundant, transmitting to the wireless device a response to the task request based on the data received from at least one vehicle control module; otherwise, transmitting a message to the vehicle to execute the task.

20 Claims, 2 Drawing Sheets

SYSTEM AND METHOD TO DYNAMICALLY DETERMINE STATUS OF VEHICLE TO BE USED BY MOBILE APPLICATION

TECHNICAL FIELD

The present invention relates to vehicle systems and, more particularly, to systems and methods for dynamically determining a vehicle's status and to facilitate remote communications with the vehicle through a wireless device using that vehicle status.

BACKGROUND

Modern vehicles are often equipped with hardware that enables a variety of wireless communications, including remote communications between the vehicle and a wireless device. These communications may be implemented through a software application installed on the wireless device, which enables a user to remotely access vehicle information and to control various vehicle functions such as locking/unlocking the doors, opening/closing the trunk, turning on/off the engine, and even locating the vehicle. While transparent to the user, access and control of vehicle features through the software application are implemented through a vehicle call center in response to communications between the call center and the software application. For example, when the user initiates remote control of a vehicle function or requests data, the software application transmits a message to the vehicle call center, which in turn, automatically sends a request for information or a command to the vehicle to execute the requested function. The communication between the vehicle call center and the vehicle is generally carried out through a cellular connection.

SUMMARY

According to an embodiment of the invention, there is provided a method for facilitating remote communications with a vehicle using a wireless device. The method includes automatically receiving data from at least one vehicle control module, receiving a request from the wireless device to perform a task relating to the vehicle, determining a status of a vehicle function based on the data received from the at least one vehicle control module, determining whether the task is redundant based on the status of the vehicle function, and when the requested task is redundant, transmitting to the wireless device a response to the task request based on the data received from at least one vehicle control module; otherwise, transmitting a message to the vehicle to execute the task.

According to another embodiment of the invention, there is provided a method for facilitating remote communications with a vehicle using a wireless device. The method includes receiving data from at least one vehicle control module, wherein the data is received in response to a trigger event, receiving a request from the wireless device to perform a task relating to the vehicle, wherein the task includes accessing vehicle data, activating a vehicle function, or both, determining a status of a vehicle function that relates to the task request, wherein the status is based on the data received from the at least one vehicle control module, determining whether the task is redundant based on the status of the vehicle function that relates to the task request, and when the requested task is redundant, transmitting to the wireless device a response to the task request based on the data received from at least one vehicle control module; otherwise, transmitting a message to the vehicle to execute the task.

According to another embodiment of the invention, there is provided system for facilitating remote communications with a vehicle using a wireless device. The system includes a remote server in communication with at least one vehicle control module and a wireless device. The remote server is configured to automatically receive data from at least one vehicle control module, receive a request from the wireless device to perform a task relating to the vehicle, determine a status of a vehicle function based on the data received from the at least one vehicle control module, determine whether the task is redundant based on the status of the vehicle function, and when the requested task is redundant, transmit to the wireless device a response to the task request based on the data received from at least one vehicle control module; otherwise, transmit a message to the vehicle to execute the task.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below are directed to determining a vehicle's status and facilitating remote communications with the vehicle through a wireless device using that vehicle status. The method includes receiving at a vehicle call center vehicle data transmitted from the vehicle in response to a triggering event. In one embodiment, the triggering events relate to a vehicle function change-of-state, such as an ignition turning on or off. The received data is time-stamped, associated with a vehicle identification number, and stored in a database. To minimize cellular data connections between the call center and the vehicle, when a request is received from a wireless device to perform a task relating to the vehicle (e.g., accessing vehicle data and/or activating a vehicle function), the stored data is used to determine a vehicle status. The vehicle status is used to determine if the requested task is redundant in view of the vehicle status. If the requested task is redundant, a response to the task is generated and sent to the wireless device based on the stored data. If the requested task is not redundant, a request and/or command is sent to the vehicle to execute the task. By determining whether the task is redundant, the "calls" to the vehicle from the call center over the cellular data connection are minimized, thereby improving the response time of the communication between the vehicle, the wireless device, and the vehicle call center, and reducing costs associated with the cellular data transmission.

Communications System—

Figure 1:
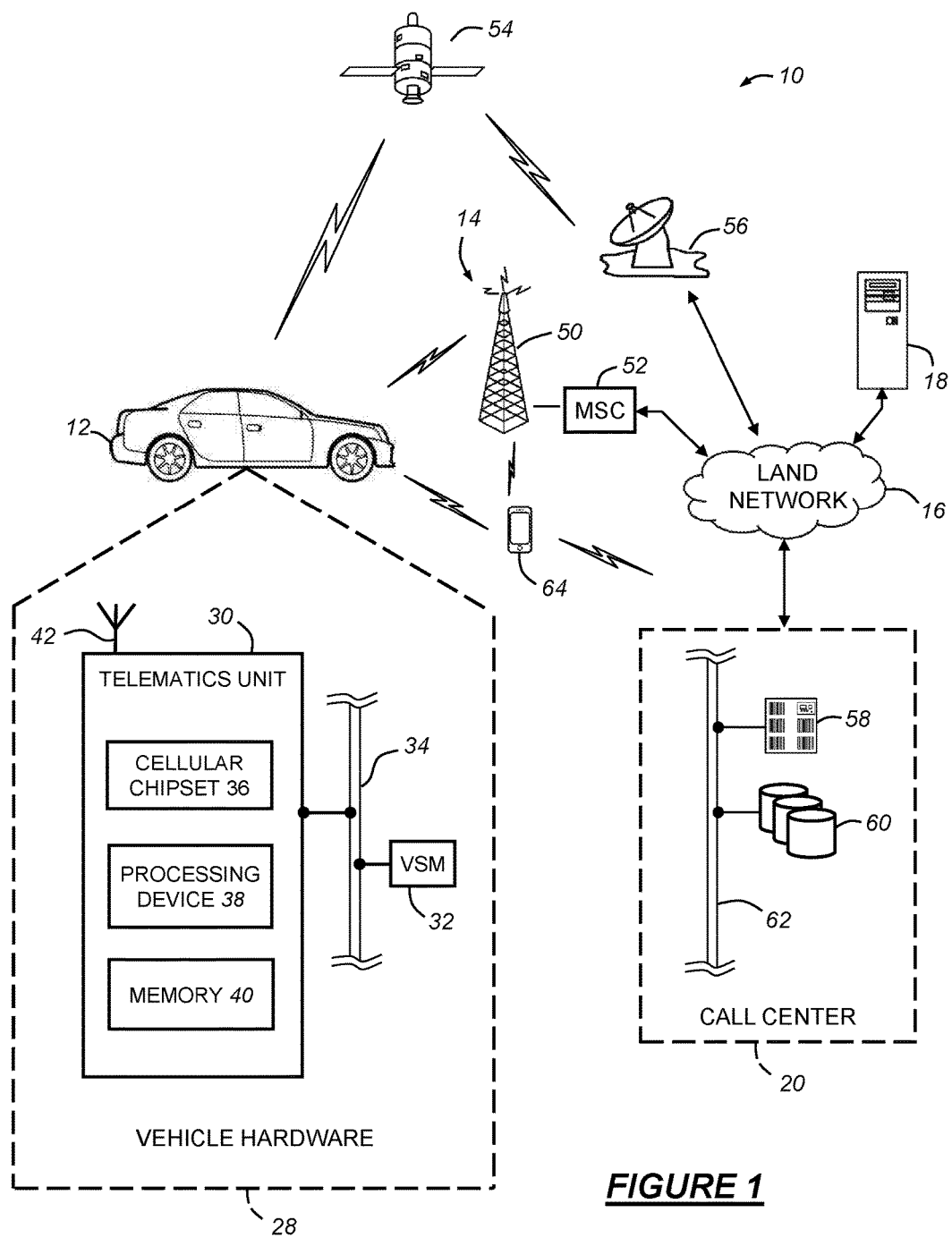
FIG. 1 is a block diagram depicting an embodiment of a communications system that is capable of utilizing the method disclosed herein.

With reference to FIG. 1, there is shown an operating environment that comprises a vehicle communications system 10 that can be used to implement the method disclosed herein. Communications system 10 generally includes a vehicle 12, one or more wireless carrier systems 14, a land communications network 16, a computer 18, and a call center 20, which may also be referred to as a remote central facility. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and include a telematics unit 30 and a number of vehicle system modules (VSMs) 32. These devices can be directly connected or indirectly connected using one or more network connections, such as a communications bus 34. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is itself a vehicle system module (VSM) and can be implemented as an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, UMTS, CDMA, 4G LTE, or 5G standards and beyond. Thus, telematics unit 30 includes a standard cellular chipset 36 for voice communications like hands-free calling, a wireless modem for data transmission, an electronic processing device 38, one or more digital memory devices 40, and a dual antenna 42. It should be appreciated that the modem can either be implemented through software that is stored in the telematics unit and is executed by processor 38, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit 30 can be configured with a static IP address or can set up to automatically receive an assigned IP address from another device on the network such as a router or from a network address server.

Processor 38 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 38 executes various types of digitally-stored instructions, such as software or firmware programs stored in memory 40, which enable the telematics unit 30 to provide a wide variety of services. For instance, processor 38 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 32 located external to telematics unit 30, they could utilize vehicle bus 34 to exchange data and commands with the telematics unit 30.

Vehicle system modules (VSMs) 32 in the form of electronic hardware components are located throughout the vehicle. VSMs 32 typically receive input from one or more sensors and use the sensed input to perform diagnostic, monitoring, control, reporting and/or other functions. Each of the VSMs 32 is preferably connected by communications bus 34 to the other VSMs, as well as to the telematics unit 30, and can be programmed to run vehicle system and subsystem diagnostic tests. As examples, one VSM 32 can be an engine control module (ECM) that controls various aspects of engine operation such as fuel ignition and ignition timing. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle.

In some embodiments, the VSMs may include a processor and memory (not shown). The processor can be any type of device capable of processing electronic instructions including microprocessors, microcontrollers, host processors, controllers, vehicle communication processors, and application specific integrated circuits (ASICs). The processor may execute various types of digitally-stored instructions, such as software or firmware programs stored in the memory, which enable the processor to execute programs or process data to carry out at least a part of the method discussed herein. The memory may include non-transitory computer usable or readable medium, which include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes.

Wireless carrier system 14 is preferably a cellular telephone system that includes a plurality of cell towers 50 (only one shown), one or more mobile switching centers (MSCs) 52, as well as any other networking components required to connect wireless carrier system 14 with land network 16. Each cell tower 50 includes sending and receiving antennas and a base station, with the base stations from different cell towers being connected to the MSC 52 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 54 and an uplink transmitting station 56. Uni-directional communication can be, for example, satellite radio services, wherein programming content (news, music, etc.) is received by transmitting station 56, packaged for upload, and then sent to the satellite 54, which broadcasts the programming to subscribers. Bi-directional communication can be, for example, satellite telephony services using satellite 54 to relay telephone communications between the vehicle 12 and station 56. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. In one embodiment, the vehicle data received at computer 18 may fuel and emissions related data such as an accumulated value for lifetime fuel used and lifetime fuel economy. A computer 18 can also be used for providing Internet connectivity such as DNS services or as a network address server that uses DHCP or other suitable protocol to assign an IP address to the vehicle 12.

Call center 20, which may also be referred to as a central data center, is designed to provide the vehicle electronics 28 with a number of different system back-end functions and, according to the exemplary embodiment shown here, generally includes servers 58 and databases 60. These various call center components are preferably coupled to one another via a wired or wireless local area network 62. Data transmissions are passed via a modem (not shown) to server 58 and/or database 60. Server 58 is a remote backend server that is accessible by the vehicle via telematics unit 30 and wireless carrier 14, and can be, for example, used to upload diagnostic information and other vehicle data from the vehicle via the telematics unit 30. Database 60 is a remote backend database configured to store account information such as subscriber authentication information, vehicle identifiers, profile records, behavioral patterns, and other pertinent subscriber information. In one embodiment, database 60 may also store general vehicle and diagnostic data, such as, but not limited to, fuel information (e.g., lifetime fuel used, lifetime fuel economy, fuel range, fuel remaining, etc.), remaining oil life, tire pressure, and battery information (e.g., state of charge), to name a few. Data transmissions may also be conducted by wireless systems, such as 802.11x, GPRS, and the like.

The operating environment may further include one or more handheld communications devices (HCDs) or wireless devices 64. The wireless device may be an electronic device which may be used to make mobile telephone calls across a wide geographic area where transmissions are facilitated by the wireless carrier system 14 (i.e., when the wireless device is connected to the wireless carrier system).

The wireless device may further include: hardware, software, and/or firmware enabling cellular telecommunications and communications via short-range wireless communication (e.g., Wi-Fi Direct and Bluetooth) as well as other wireless device applications. The hardware of the wireless device 64 may comprise: a processor and memory (e.g., non-transitory computer readable medium configured to operate with the processor) for storing the software, firmware, etc. The wireless device processor and memory may enable various software applications, which may be preinstalled or installed by the user (or manufacturer) (e.g., having a software application or graphical user interface or GUI). One commercial implementation of a vehicle-wireless device application may be RemoteLink™, enabling a vehicle user to communicate with the vehicle 12 and/or control various aspects or functions of the vehicle—e.g., among other things, allowing the user to remotely lock/unlock vehicle doors, turn the vehicle On/Off, check the vehicle tire pressures, fuel level, lifetime fuel economy, oil life, etc. RemoteLink™ may also allow the user to connect with the call center 20 at any time.

The wireless device hardware also may include a display, a keypad (e.g., push button and/or touch screen), a microphone, one or more speakers, motion-detection sensors (such as accelerometers, gyroscopes, etc.), and a camera. In addition to the aforementioned features, modern wireless devices may support additional services and/or functionality such as short messaging service (SMS or texts), multimedia messaging service (MMS), email, internet access, as well as business and gaming applications.

Non-limiting examples of the wireless device 64 include a cellular telephone, a personal digital assistant (PDA), a Smartphone, a personal laptop computer or tablet computer having two-way communication capabilities, a netbook computer, or any suitable combinations thereof. The wireless device 64 may be used inside or outside of a mobile vehicle (such as the vehicle 12 shown in FIG. 1), and may be coupled to the vehicle by wire or wirelessly (e.g., using short range wireless communication). The wireless device also may be configured to provide services according to a subscription agreement with a third-party facility or wireless/telephone service provider. It should be appreciated that various service providers may utilize the wireless carrier system and that the service provider of the telematics unit 30 may not necessarily be the same as the service provider of the wireless devices 64.

The wireless device 64 and the vehicle 12 may be used together by a person known as the vehicle user such as the driver. However, the vehicle user does not need to be the driver of the vehicle 12 nor does the vehicle user need to have ownership of the wireless device 64 or the vehicle 12 (e.g., the vehicle user may be an owner or a licensee of either or both).

Method—

Figure 2:
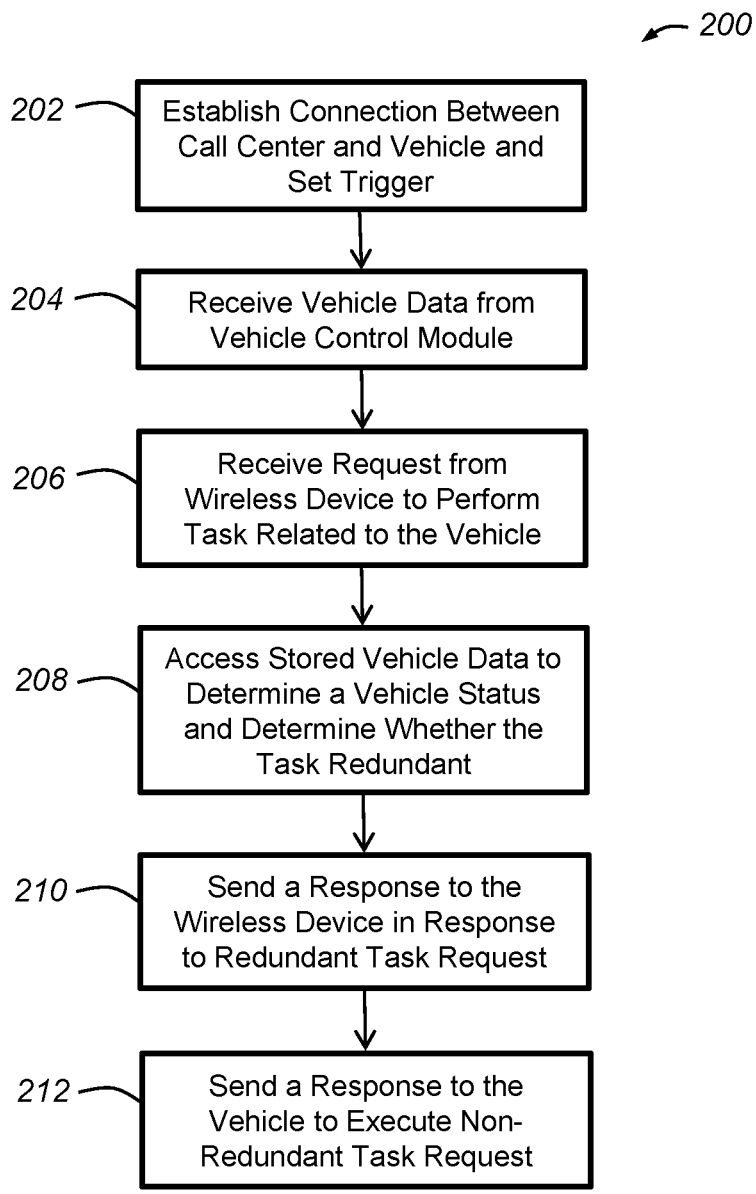
FIG. 2 is a flow chart illustrating an exemplary method for determining a vehicle's status and to facilitate remote communications with the vehicle through a wireless device according to one embodiment of the present invention.

Turning now to FIG. 2, there is flow chart illustrating a method 200 for facilitating remote communications with a vehicle 12 using a wireless device 64. While the embodiment described below depicts a software application being implemented on the wireless device 64, one of ordinary skill in the art understands that any suitable software application residing on any computing device may be used.

At step 202, a connection is established between the call center 20 and the vehicle 12. In one embodiment, the connection is a data connection in the form of a packet call initiated by the call center 20, and more particularly, server 58. Alternatively, the connection may be initiated by computer 18. Through the connection, a trigger is set in the vehicle 12, and more particularly, in the telematics unit 30 and/or the VSMs 32. The trigger may be a set of instructions (e.g., code, script, or the like) that are capable of being read and executed by the telematics unit 30 and/or the VSMs 32. Stated differently, the trigger may refer to a task set in the telematics unit 30 and/or the VSMs 32 that initiates performance of an action when one or more conditions is met. The trigger may also refer to a SQL procedure that initiates an action (i.e., fires an action) when an event (relating to a condition) occurs.

In one embodiment, the trigger is set to fire in response to a triggering event, which may include a change in state of a vehicle function, such as, but not limited to, turning an engine on or off, locking or unlocking a door, opening or closing a vehicle compartment, and turning lights on or off, to name a few. When the trigger fires, a data connection (e.g., a packet call) is established at step 204 between the vehicle 12 and the call center 20, and in one particular embodiment, between the telematics unit 30 and/or the VSMs 32 and the server 58. Through the connection, vehicle data is transmitted from the vehicle 12 to the call center 20. The vehicle data may include without limitation, diagnostic data relating to fuel usage (e.g., lifetime fuel used, lifetime fuel economy, fuel range, fuel remaining, etc.), remaining oil life, tire pressure, and battery information (e.g., state of charge), and/or to the state of a vehicle function or component, such as, for example, the state of the engine, doors, vehicle compartment, and lights, to name a few. In one embodiment, the transmitted vehicle data received at the call center 20 is time-stamped, associated with a particular vehicle using, for example, the vehicle identification number (VIN), and stored in a database, such as database 60.

At step 206, a request is received at the call center 20, and in particular, remote server 58, from the wireless device 64. In one embodiment, the request is received from a software application (e.g., RemoteLink™) installed on the wireless device 64. The request generally relates to a request to perform a task relating to the vehicle. For example, the task may be to access vehicle data and/or to activate a vehicle function. The vehicle data may refer to a state of a particular vehicle component and/or parameter such as fuel level and/or consumption, battery condition, oil life, tire condition, etc. The vehicle function may refer to any remotely controllable or accessible vehicle function such as turning an engine on or off, locking or unlocking a door, opening or closing a vehicle compartment, and turning lights on or off, to name a few.

In response to the request, at step 208 the remote server 58 accesses the most recent transmission of stored vehicle data from database 60 to determine a vehicle (or vehicle component) status, and if the task associated with the request is redundant based on that status. Redundancy is determined based on the requested task and the status or current state of a vehicle component and/or function related to the task. In general, a task is redundant when the task can be achieved using vehicle data cached in the database 60, and/or the vehicle component subject to the task is already in the requested or desired state. For example, when the task relates to a request to lock the vehicle doors, the most recent stored vehicle data (i.e., cached data having the most recent time-stamp) is accessed to determine the current state (i.e., locked or unlocked) of the vehicle doors. If the vehicle doors are currently locked, a subsequent "call" to the vehicle 12 from the call center 20 is unnecessary. Therefore, the task is redundant. Similarly, when the task relates to a request for diagnostic data such as, for example, the current fuel level, the most recent data from the database is accessed to determine the current state of the vehicle (i.e., is the vehicle ignition or engine on or off). If the vehicle engine is off, fuel is not currently being consumed. Therefore, the vehicle data transmitted to the call center 20 in response to the vehicle engine being turned off (i.e., a change-of-state triggering event) is the current fuel level. Consequently, transmitting a request to the vehicle 12 to access the vehicle data is unnecessary, and the task is therefore redundant in view of the vehicle's status.

When the requested task is redundant, at step 210 a response is sent to the wireless device 64 that includes the requested data, and/or a message indicating that the requested vehicle function is currently in the desired state. For example, if the task relates to a request for diagnostic data, such as battery state of charge, and the task is determined in step 208 to be redundant, the response to the wireless device includes transmission of the requested battery data based on information acquired from the cached vehicle data. If the task relates to a request to start the vehicle engine and the task is determined in step 208 to be redundant based on the vehicle's status, the response to the wireless device includes a message indicating that the vehicle engine is currently running.

When the requested task is not redundant, at step 212 the call center 20 transmits a request and/or command to the vehicle 12 to execute the requested task. A subsequent message may also be transmitted to the wireless device in response to executing the task in step 212.

The method described above or parts thereof may be implemented using a computer program product may include instructions carried on a computer readable medium for use by one or more processors of one or more computers (e.g., within the HCD or telematics unit) to implement one or more of the method steps. The computer program product may include one or more software programs (or applications) comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of executing instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method for facilitating remote communications with a vehicle using a wireless communications device, the method comprising the steps of:
    automatically receiving data from at least one vehicle control module, wherein the data is time-stamped and stored in a database at a central data center;
    receiving a request at the central data center from the wireless communications device to perform a task relating to the vehicle;
    determining, at the central data center, a status of a vehicle function based on the stored data having the most recent timestamp;
    determining, at the central data center, whether the task is redundant based on the status of the vehicle function; and
    when the requested task is redundant, transmitting to the wireless communications device a response to the task request based on the data received from the at least one vehicle control module; otherwise, transmitting a message to the vehicle to execute the task.

2. The method of claim 1, wherein the task to be performed includes activating a vehicle function, accessing vehicle data, or both.

3. The method of claim 2, wherein activating the vehicle function includes at least one, or a combination of, turning an engine on or off; locking or unlocking a door; opening or closing a vehicle compartment; and turning lights on or off.

4. The method of claim 2, wherein accessing vehicle data includes accessing vehicle diagnostic data.

5. The method of claim 2, wherein accessing vehicle data includes at least one, or a combination of, lifetime fuel used; lifetime fuel economy; fuel range; fuel remaining; remaining oil life; tire pressure; and battery state.

6. The method of claim 1, wherein the data is automatically received in response to a trigger in the at least one vehicle control module.

7. The method of claim 6, wherein the trigger represents a set of instructions that initiate transmission of the data from the at least one vehicle control module to a remote server when a triggering event occurs.

8. The method of claim 7, wherein the triggering event includes a change in state of a vehicle function.

9. The method of claim 8, wherein the vehicle function includes at least one, or a combination of, turning an engine on or off; locking or unlocking a door; opening or closing a vehicle compartment; and turning lights on or off.

10. The method of claim 1, further including associating the received data with a vehicle identification number.

11. The method of claim 1, wherein the task to be performed includes accessing vehicle diagnostic data, and the step of determining whether the task is redundant is based on the status of the vehicle engine, and wherein the task is redundant when the vehicle engine status is off.

12. The method of claim 11, wherein the response to the task request is based on vehicle diagnostic data acquired from the stored data having the most recent timestamp.

13. The method of claim 1, wherein the task to be performed includes activating a vehicle function to a desired state, and wherein the task is redundant when the status of the vehicle function is the same as the desired state of the vehicle function.

14. The method of claim 1, further including transmitting a message to the wireless communications device in response to executing the task.

15. The method of claim 1, wherein the task request from the wireless communications device is received from a software application installed on the wireless device.

16. A method for facilitating remote communications with a vehicle using a wireless communications device, the method comprising the steps of:
 receiving data from at least one vehicle control module, wherein the data is received in response to a trigger event;
 time-stamping and storing the received data in a database at a central data center;
 receiving a request at the central data center from the wireless communications device to perform a task relating to the vehicle, wherein the task includes accessing vehicle data, activating a vehicle function, or both;
 determining, at the central data center, a status of a vehicle function that relates to the task request, wherein the status is based on the stored data having the most recent timestamp;
 determining, at the central data center, whether the task is redundant based on the status of the vehicle function that relates to the task request; and
 when the requested task is redundant, transmitting to the wireless communications device a response to the task request based on the data received from the at least one vehicle control module; otherwise, transmitting a message to the vehicle to execute the task.

17. A system for facilitating remote communications with a vehicle using a wireless communications device, the system comprising:
 a remote server in communication with at least one vehicle control module and the wireless communications device, the remote server configured to:
 automatically receive data from at least one vehicle control module, wherein the data is time-stamped and stored in a database at a central data center;
 receive a request from the wireless communications device to perform a task relating to the vehicle;
 determine a status of a vehicle function based on the stored data having the most recent timestamp;
 determine whether the task is redundant based on the status of the vehicle function; and
 when the requested task is redundant, transmit to the wireless communications device a response to the task request based on the data received from the at least one vehicle control module; otherwise, transmit a message to the vehicle to execute the task.

18. The system of claim 17, wherein the task to be performed includes accessing vehicle diagnostic data, and the step of determining whether the task is redundant is based on the status of the vehicle engine, and wherein the task is redundant when the vehicle engine status is off.

19. The method of claim 18, wherein the response to the task request is based on vehicle diagnostic data acquired from the stored data having the most recent timestamp.

20. The method of claim 17, wherein the task to be performed includes activating a vehicle function to a desired state, and wherein the task is redundant when the status of the vehicle function is the same as the desired state of the vehicle function.

* * * * *